United States Patent
Wang et al.

(10) Patent No.: US 10,578,275 B2
(45) Date of Patent: Mar. 3, 2020

(54) DOUBLE FREEFORM-SURFACE LENS WITH UNIFORM COLOR TEMPERATURE

(71) Applicant: ZHONGSHAN INSTITUTE OF MODERN INDUSTRIAL TECHNOLOGY, SOUTH CHINA UNIVERSITY OF TECHNOLOGY, Guangdong (CN)

(72) Inventors: Hong Wang, Guangdong (TW); Peng Ge, Guangdong (TW); Xiang Wang, Guangdong (TW)

(73) Assignee: ZHONGSHAN INSTITUTE OF MODERN INDUSTRIAL TECHNOLOGY, SOUTH CHINA UNIVERSITY OF TECHNOLOGY, Guangdong (CN)

( * ) Notice: Subject to any disclaimer, the term of this patent is extended or adjusted under 35 U.S.C. 154(b) by 0 days.

(21) Appl. No.: 16/472,202

(22) PCT Filed: Aug. 16, 2018

(86) PCT No.: PCT/CN2018/100769
§ 371 (c)(1),
(2) Date: Jun. 21, 2019

(87) PCT Pub. No.: WO2019/015695
PCT Pub. Date: Jan. 24, 2019

(65) Prior Publication Data
US 2019/0323679 A1    Oct. 24, 2019

(30) Foreign Application Priority Data

Jul. 21, 2017   (CN) .......................... 2017 1 0599035

(51) Int. Cl.
*F21V 5/04*    (2006.01)
*F21S 41/20*   (2018.01)

(52) U.S. Cl.
CPC .............. *F21V 5/04* (2013.01); *F21S 41/285* (2018.01)

(58) Field of Classification Search
None
See application file for complete search history.

(56) References Cited

U.S. PATENT DOCUMENTS 6,866,408 B1    3/2005   Albou

FOREIGN PATENT DOCUMENTS

| CN | 102606977 | 7/2012 |
| CN | 104317053 | 1/2015 |

(Continued)

OTHER PUBLICATIONS

"International Search Report (Form PCT/ISA/210) of PCT/CN2018/100769," dated Nov. 7, 2018, with English translation thereof, pp. 1-5.

*Primary Examiner* — Britt D Hanley
(74) *Attorney, Agent, or Firm* — JCIP Global Inc.

(57) ABSTRACT

The present invention provides a double freeform-surface lens with uniform color temperature including an incident free surface, an emergent freeform-surface and a side connecting face. The side connecting face is a side wall connecting the incident freeform-surface and the emergent freeform-surface. Aiming at impacts of using the single lens on color temperature upon LED light distribution, the double freeform-surface lens is designed, which is fabricated from a transparent optical material. The transparent material is PC or PMMA or optical glass. The double freeform-surface lens is capable of controlling a light distribution angle, and light spots obtained have uniform color temperature.

4 Claims, 3 Drawing Sheets

(56) References Cited

FOREIGN PATENT DOCUMENTS

| CN | 104566217 | 4/2015 |
| CN | 105589991 | 5/2016 |
| CN | 107191861 | 9/2017 |
| CN | 207962520 | 10/2018 |

DOUBLE FREEFORM-SURFACE LENS WITH UNIFORM COLOR TEMPERATURE

CROSS-REFERENCE TO RELATED APPLICATION

This application is a 371 of international application of PCT application serial no. PCT/CN2018/100769, filed on Aug. 16, 2018, which claims the priority benefit of China application no. 201710599035.5, filed on Jul. 21, 2017. The entirety of each of the above mentioned patent applications is hereby incorporated by reference herein and made a part of this specification.

TECHNICAL FIELD

The present invention relates to the field of special lighting (for example, automobile lighting), and in particular, relates to a double freeform-surface lens with uniform color temperature that is applicable to the fields of household and commercial lighting, and lighting on special roads.

BACKGROUND

At present, in the field of special lighting (automobile lighting), two systems are generally employed: light distribution by a lens or a reflector or a combination thereof, wherein a typical light distribution system generally employs a single lens; effect of light distribution by an incident surface/an emergent surface is realized using a freeform-surface or a double freeform-surface. However, the single lens is inevitably subject to optical distortion, for example, chromatic aberration (chromatic dispersion), distortion (pincushion distortion or barrel distortion), spherical aberration or the like. Few studies are currently carried out for the impacts of using the single lens on color temperature upon LED light distribution.

In light distribution by a freeform-surface optical lens, the freeform-surface is mainly employed on the incident surface or the emergent surface, or the double freeform-surface that combines the both.

Till now, many designs are directed to illumination control and light energy distribution, whereas few designs are concentrated on lighting with uniform color temperature. Therefore, it is necessary to develop a double freeform-surface design for automobile lighting, to obtain a double freeform-surface lens to achieve lighting light spots with uniform color temperature.

SUMMARY OF THE INVENTION

An objective of the present invention is to provide a double freeform-surface lens with uniform color temperature, to overcome the above defects in the prior art. In the field of special lighting (automobile lighting), two systems are generally employed: light distribution by a lens or a reflector or a combination thereof, wherein a typical light distribution system generally employs a single lens; the effect of light distribution by an incident surface/an emergent surface is realized using a freeform-surface or a double freeform-surface. However, the single lens is inevitably subject to optical distortion, for example, chromatic aberration (chromatic dispersion), distortion (pincushion distortion or barrel distortion), spherical aberration or the like. Few studies are currently carried out for the impacts of using the single lens on color temperature upon LED light distribution.

The objective of the present invention is implemented at least via one of the following technical solutions.

A double freeform-surface lens with uniform color temperature includes an incident free surface, an emergent freeform-surface and a side connecting face; wherein the side connecting face is a side wall connecting the incident freeform-surface and the emergent freeform-surface.

Further, shapes of the incident freeform-surface and the emergent freeform-surface are defined as follows: a light distribution angle $\theta_\theta$ is defined as an included angle between a normal vector $\vec{N}$ and an emergent vector $\vec{Out}$ in the law of refraction and reflection $[1+n^2-2n(\vec{Out}*\vec{In})]^{1/2}*\vec{N}=\vec{Out}-n\cdot\vec{In}$, a uniform color temperature is achieved by controlling $\theta_\theta$ to be a constant value, the included angle between $\vec{N}$ and $\vec{Out}$ is made to be constant by keeping the light distribution angle to be constant, n is a refractive index of the lens, and a following equation is obtained by a vector relation:

$$\cos\theta_k = \frac{\vec{N}\vec{Out}}{|\vec{N}||\vec{Out}|}.$$

Using a free curve of any cross section as an example, coordinates of a point in the emergent surface are defined as (x1, y1) and coordinates of a point in an incident surface are defined as (x2, y2), and then $\vec{Out1}$=(H-y1, R-x1) and $\vec{In1}$=(y1-y2, x1-x2) are obtained from a relation of point coordinates, wherein H denotes an lighting surface distance and is defined according to related standards, R denotes a distance from a point on the lighting surface obtained based on a light source angle α according to an energy corresponding relationship to a center; and $\vec{N}$ is reversely calculated according to the above equation, and $\vec{In}$ is finally calculated to obtain a first equation group.

A refraction and reflection relation is established on the incident surface:

$$[1+n^2-2n(\vec{Out}*\vec{In})]^{1/2}*\vec{N}=n\cdot\vec{Out}-\vec{In}$$

$$\vec{In2}=(\sin\alpha, \cos\alpha), \vec{Out2}=\vec{In1}=(y1-y2, x1-x2),$$

a second equation group is established, an iterative calculation is performed to obtain a double freeform-surface to be calculated, and the obtained free curve is drawn into a three-dimensional entity in a three-dimensional drawing software.

Further, the light distribution angle is an included angle between the normal vector at any point of the freeform-surface and the emergent vector, and is presented as a curvature of the freeform-surface and capable of controlling a refractive angle of the emergent surface.

Further, in the energy corresponding relationship, with respect to an automobile high-beam lamp, a target lighting region is defined to be elliptical, a major axis thereof is defined to be a and a minor axis thereof is defined to be b; a total light flux of a light source is defined to be Q, and a central light intensity is defined to be I0; the light source is defined to be Lambertian type, θ in the coordinate system is an included angle between a projection of an emergent light in an XOY plane and an X axis, and is an included angle between the emergent light and a forward direction of a Z axis; a three-dimensional angle of the light source is discretized and equally divided into i parts, θ is equally divided into j parts with respect to each of the i parts to form a series of angular annular zone regions, thereby obtaining an array of θ(i, j).

A light flux of the light source within each part of the θ angle in each part of the three-dimensional angle is:

$$E_{total} = \int_{\theta(i,j)}^{\theta(i,j+1)} \int_{\varphi(i)}^{\varphi(i+1)} I_0 \cos\varphi \sin\varphi d\varphi d\theta.$$

An annular zone division is carried out for the target lighting region based on the energy conservation law.

Corresponding to the annular zone division of the three-dimensional angle of the light source, rectangular coordinates of the lighting surface are also correspondingly divided into elliptical annular zone regions, a semi-major axis a and a semi-minor axis b of the ellipse are respectively divided into i parts in x and y directions, and a formed ellipse is represented by:

x=$a_i$ cos α y=$b_i$ cos α wherein ai represents an ith part of the semi-major axis a upon an equal division, bi represents an ith part of the semi-minor axis b upon the equal division, and α takes a value in a range of 0 to 2π.

With respect to each i, a is divided into j parts, arrays ai, bi, x(i, j) and y (i, j) one-to-one corresponding to θ(i) and arrays in the three-dimensional angle of the light source in a rectangular coordinate system of a receiver screen are obtained.

With respect to the freeform-surface, in the target lighting region, each part of the θ angle corresponds to the annular zone region enclosed by a part of the ellipse, wherein the annular zone region has a total energy of:

$$E_l = \delta(k) \int_{-\mu}^{\mu} \int_{0}^{-v} [s(x(i+1, j), y(i+1, j)) - s(x(i, j), y(i, j))] dxdy;$$

wherein S(x(i, j, y(i, j)) represents an area function of the annular zone region defined by a part of the ellipse below an horizontal line, u represents the semi-major axis of the ellipse, v represents the semi-minor axis of the ellipse, α corresponding thereto takes a value in a range of π to 2π, δ(k) represents an illumination value, in accordance with the international standard GB25991 2010, the luminance value on the lighting surface of the high-beam lamp is defined as a predetermined illumination E, which is configured to control the illumination value in a designated region on the receiver screen in combination with the δ(k) function, form a predefined illumination distribution; and with respect to different regions on the lighting surface:

$$\delta(k) = t\frac{i-k}{i}E.$$

In the above process, the light emitted by the light source is totally projected onto the lighting surface, and the annular zone region and the three-dimensional angle of the light source observe the energy conservation law:

$E_{total} = E_l$.

Further, an optical material of the double freeform-surface lens is PC or poly(methyl methacrylate) (PMMA) or optical glass.

Compared with the prior art, the present invention has the following advantages and achieves the following beneficial effects:

In the field of special lighting (automobile lighting), two systems are generally employed: light distribution by a lens or a reflector or a combination thereof, wherein a typical light distribution system generally employs a single lens; effect of light distribution by an incident surface/an emergent surface is realized using a freeform-surface or a double freeform-surface. However, the single lens is inevitably subject to optical distortion, for example, chromatic aberration (chromatic dispersion), distortion (pincushion distortion or barrel distortion), spherical aberration or the like. Few studies are currently carried out for the impacts of using the single lens on color temperature upon LED light distribution. In view of the above technical problem, the present invention provides a double freeform-surface lens capable of controlling a light distribution angle, which is fabricated from a transparent optical material. The transparent material is PC or PMMA or optical glass. Light spots obtained by the double freeform-surface lens have uniform color temperature.

DETAILED DESCRIPTION OF THE PREFERED EMBODIMENT

Specific implementation of the present invention is further described in detail with reference to the accompanying drawings and embodiments. However, the implementation and protection of the present invention are not limited hereto.

Figure 1:
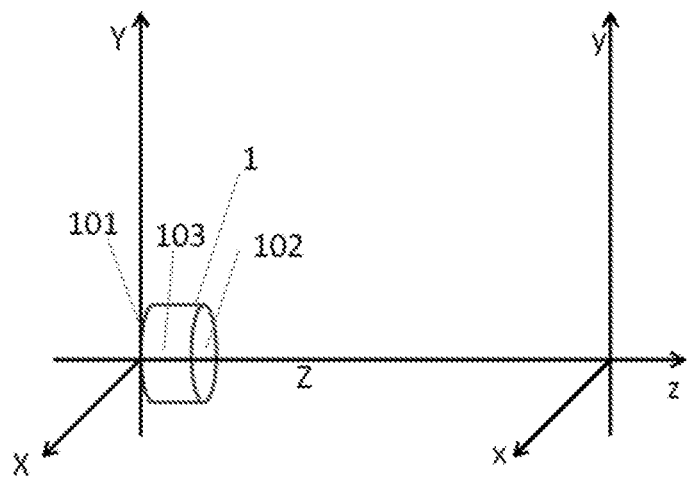
FIG. 1 is a schematic diagram of establishing calculation of a three-dimensional coordinate system according to an embodiment.
Figure 2:
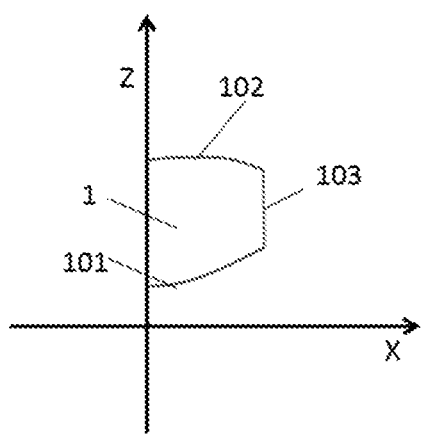
FIG. 2 is a schematic diagram of a coordinate system of any section according to an embodiment.
Figure 3:
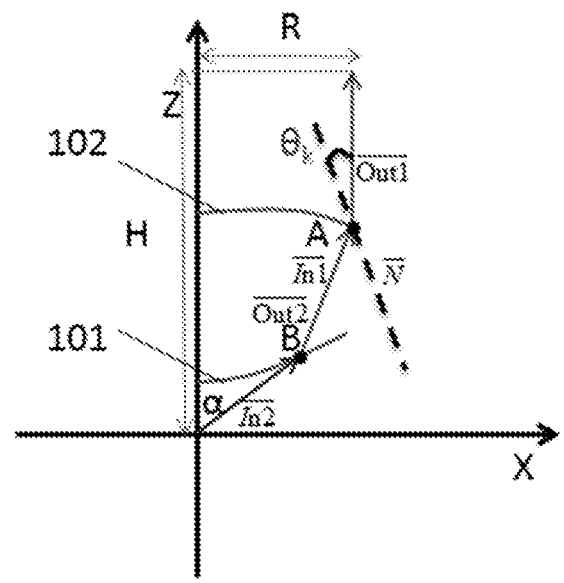
FIG. 3 is a schematic diagram of calculation of any section of a double freeform-surface according to an embodiment.
Figure 4:
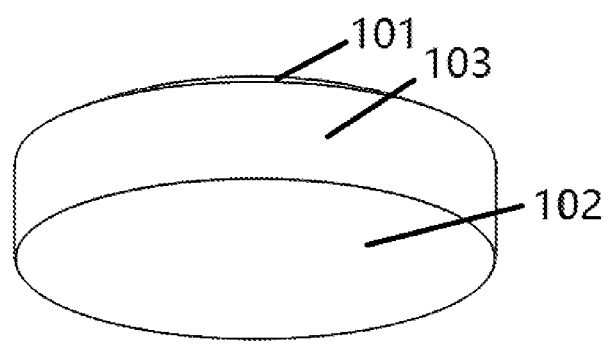
FIG. 4 is a three-dimensional effect diagram of a calculated freeform-surface according to an embodiment.
Figure 5:
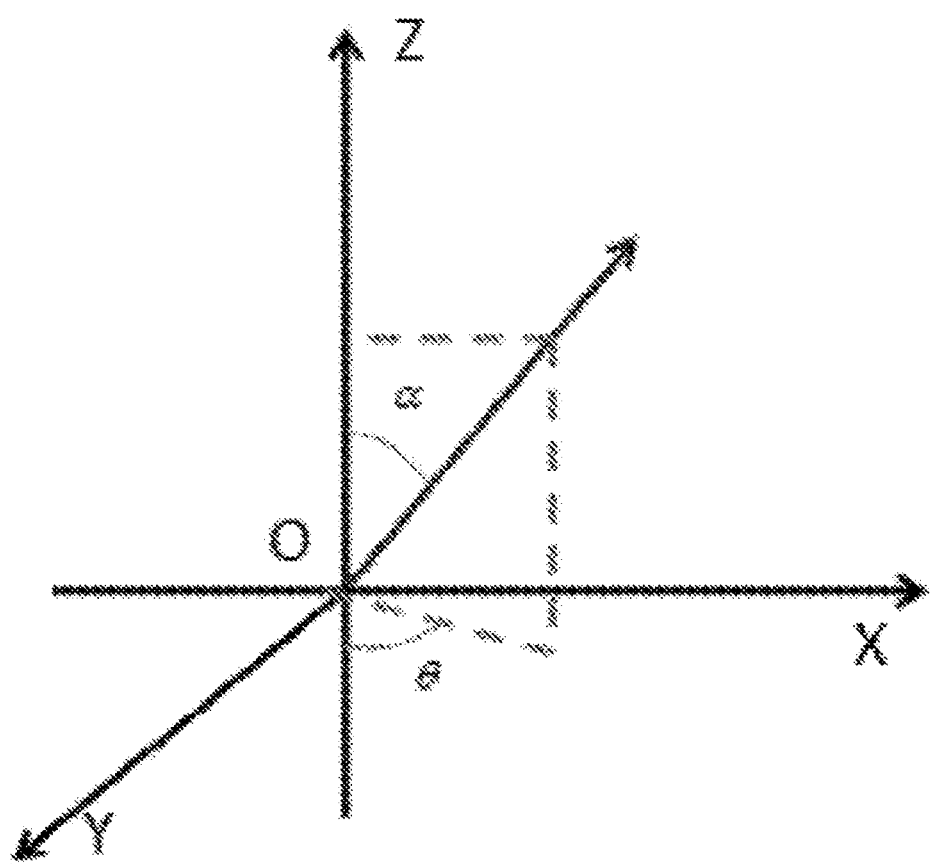
FIG. 5 is a schematic diagram of division of a light source coordinate system according to an embodiment.

As illustrated in FIG. 1 to FIG. 5, a double freeform-surface lens 1 includes an incident freeform-surface 101, an emergent freeform-surface 102 and a side connecting face 103. $\theta_K$ represents a controlled constant light distribution angle. θ represents an included angle between an emergent light projected on an XOY plane and an X axis. α represents an included angle between an emergent light and an emergent central axis Z. XYZ represents a three-dimensional coordinate system of the lens. xyz represents a three-dimensional coordinate system of the lighting surface. XOZ represents a coordinate system of any section, α represents any light source angle, A (x1, y1) represents a point on a corresponding emergent free curve, B (x2, y2) represents a point on a corresponding incident free curve, H represents a distance from a center O to the lighting surface, R represents a distance from a point on the lighting surface based on the light source angle α according to the energy corresponding relationship to the center. $\vec{In1}$ represents an incidence vector of the emergent freeform-surface, $\vec{N}$ represents a normal vector of the emergent freeform-surface, $\vec{Out1}$ represents an emergent vector of the emergent freeform-surface, $\vec{In2}$ represents an incidence vector of the incidence freeform-surface, and $\vec{Out2}$ represents an emergent vector of the incidence freeform-surface.

As illustrated in FIG. 1 to FIG. 4, when the lens is applied to the field of automobile lighting, a material is defined as PC, a light distribution angle $\theta_0$ is defined as an included angle between the normal vector $\vec{N}$ and an emergent vector $\vec{Out}$ in the law of refraction and reflection $[1+n^2-2n(\vec{Out}*\vec{In})]^{1/2}*\vec{N}=\vec{Out}-n\cdot\vec{In}$, a uniform color temperature is achieved by controlling $\theta_0$ to be a constant value $\theta_k$ (10 degrees), the included angle between $\vec{N}$ and $\vec{Out}$ is made to be constant by keeping the light distribution angle to be constant, and a following equation is obtained by a vector relation:

$$\cos\theta_k = \frac{\vec{N}\vec{Out}}{|\vec{N}||\vec{Out}|}.$$

Using a free curve of any section as an example, coordinates of a point in an emergent surface are defined as (x1, y1) and coordinate of a point in an incident surface are defined as (x2, y2), and then $\vec{Out1}$=(H-y1, R-x1) and $\vec{In1}$=(y1-y2, x1-x2) are obtained from a relation of point coordinates, wherein H denotes an lighting surface distance and is defined according to related standards as 25 m, R denotes a distance from a point on the lighting surface obtained based on a light source angle a according to an energy corresponding relationship to a center; and $\vec{N}$ is reversely calculated according to the above equation, and $\vec{In}$ is finally calculated to obtain a first equation group.

A refraction and reflection relation is established on the incident surface 101:

$$[1+n^2-2n(\vec{Out}*\vec{In})]^{1/2}*\vec{N}=n\cdot\vec{Out}-\vec{In}$$

$$\vec{In2}=(\sin\alpha, \cos\alpha), \vec{Out2}=\vec{In1}=(y1-y2, x1-x2).$$

A second equation group is established, an iterative calculation is performed to obtain a double freeform-surface to be calculated, and the obtained free curve is drawn into a three-dimensional entity in a three-dimensional drawing software.

The light distribution angle is the included angle between the normal vector at any point of the freeform-surface and the emergent vector, and is presented as a curvature of the freeform-surface and capable of controlling a refractive angle of the emergent surface.

With respect to an automobile high-beam lamp, a target lighting region is defined to be elliptical, a major axis thereof is defined to be a and a minor axis thereof is defined to be b; a total light flux of a light source is defined to be Q, and a central light intensity is defined to be I0; the light source is defined to be Lambertian type, θ in the coordinate system is an included angle between a projection of an emergent light in an XOY plane and an X axis, and is an included angle between the emergent light and a forward direction of a Z axis; a three-dimensional angle of the light source is discretized and equally divided into i parts, θ is equally divided into j parts with respect to each of the i parts to form a series of angular annular zone regions, thereby obtaining an array of θ(i, j).

A light flux of the light source within each part of the θ angle in each part of the three-dimensional angle is:

$$E_{total} = \int_{\theta(i,j)}^{\theta(i,j+1)} \int_{\varphi(i)}^{\varphi(i+1)} I_0 \cos\varphi \sin\varphi d\varphi d\theta.$$

An annular zone division is carried out for the target lighting region based on the energy conservation law.

Corresponding to the annular zone division of the three-dimensional angle of the light source, rectangular coordinates of the lighting surface are also correspondingly divided into elliptical annular zone regions, a semi-major axis a and a semi-minor axis b of the ellipse are respectively divided into i parts in x and y directions, and a formed ellipse is represented by:

x=$a_i$ cos α y=$b_i$ cos α wherein ai represents an ith part of the semi-major axis a upon an equal division, bi represents an ith part of the semi-minor axis b upon the equal division, and α takes a value in a range of 0 to 2π.

With respect to each i, a is divided into j parts, arrays ai, bi, x(i, j) and y(i, j) one-to-one corresponding to θ(i) and arrays in the three-dimensional angle of the light source in a rectangular coordinate system of a receiver screen are obtained.

With respect to the freeform-surface, in the target lighting region, each part of the θ angle corresponds to the annular zone region enclosed by a part of the ellipse, wherein the annular zone region has a total energy of:

$$E_l = \delta(k) \int_{-\mu}^{\mu} \int_{0}^{-v} [s(x(i+1, j), y(i+1, j)) - s(x(i, j), y(i, j))] dx dy,$$

wherein $S(x(i, j), y(i, j))$ represents an area function of the annular zone region defined by a part of the ellipse below a horizontal line, u represents the semi-major axis of the ellipse, v represents the semi-minor axis of the ellipse, α corresponding thereto takes a value in a range of π to 2π, δ(k) represents an illumination value, in accordance with the international standard GB25991 2010, the luminance value on the lighting surface of the high-beam lamp is defined as a predetermined illumination E, which is configured to control the illumination value in a designated region on the receiver screen in combination with the δ(k) function, form a predefined illumination distribution; and with respect to different regions on the lighting surface:

$$\delta(k) = t\frac{i-k}{i}E$$

wherein the light emitted by the light source is totally projected onto the lighting surface, and the annular zone region and the three-dimensional angle of the light source observe the energy conservation law:

$$E_{total} = E_l.$$

As such, the double freeform-surface lens according to the present invention may be obtained, which accommodates corresponding international standards.

What is claimed:

1. A double freeform-surface lens with uniform color temperature, wherein the double freeform-surface lens comprises an incident freeform-surface, an emergent freeform-surface and a side connecting face; wherein the side connecting face is a side wall connecting the incident freeform-surface and the emergent freeform-surface, wherein shapes of the incident freeform-surface and the emergent freeform-surface are defined as follows: a light distribution angle θ is defined as an included angle between a normal vector $\vec{N}$ and an emergent vector $\vec{Out}$ in the law of refraction and reflection: $[1+n^2 -2n(\vec{Out}*\vec{In})]^{1/2}*\vec{N}=\vec{Out}-n\cdot\vec{In}$, a uniform color temperature is achieved by controlling $\theta_\theta$ to be a constant value, the included angle between $\vec{N}$ and $\vec{Out}$ is made to be constant by keeping the light distribution angle to be constant, n is a refractive index of the lens, and a following equation is obtained by a vector relation:

$$\cos\theta_k = \frac{\vec{N}\vec{Out}}{|\vec{N}||\vec{Out}|};$$

using a free curve of any cross section as an example, coordinates of a point in an emergent surface are defined as (x1, y1) and coordinates of a point in an incident surface are defined as (x2, y2), and then $\vec{Out1}=(H-y1, R-x1)$ and $\vec{In1}=(y1-y2,x1-x2)$ are obtained from a relation of point coordinates, wherein H denotes an lighting surface distance and is defined according to related standards, R denotes a distance from a point on the lighting surface obtained based on a light source angle α according to an energy corresponding relationship to a center; and $\vec{N}$ is reversely calculated according to the above equation, and $\vec{In}$ is finally calculated to obtain a first equation group;

a refraction and reflection relation is established on the incident surface;

$$[1+n^2 -2n(\vec{Out}*\vec{In})]^{1/2}*\vec{N}=n\cdot\vec{Out}-\vec{In}$$

$\vec{In2} =(\sin α,\cos α), \vec{Out2} =\vec{In1} =(y1-y2,x1-x2)$, a second equation group is established, an iterative calculation is performed to obtain a double freeform-surface to be calculated, and the obtained free curve is drawn into a three-dimensional entity in a three-dimensional drawing software.

2. The double freeform-surface lens with uniform color temperature according to claim 1, wherein the light distribution angle is the included angle between the normal vector at any point of the freeform-surface and the emergent vector, and is presented as a curvature of the freeform-surface and capable of controlling a refractive angle of the emergent surface.

3. The double freeform-surface lens with uniform color temperature according to claim 1, wherein in the energy corresponding relationship, with respect to an automobile high-beam lamp, a target lighting region is defined to be elliptical, a major axis thereof is defined to be a and a minor axis thereof is defined to be b; a total light flux of a light source is defined to be Q, and a central light intensity is defined to be I0; the light source is defined to be Lambertian type, θ in the coordinate system is an included angle between a projection of an emergent light in an XOY plane and an X axis, and is an included angle between the emergent light and a forward direction of a Z axis; a three-dimensional angle of the light source is discretized and equally divided into i parts, θ is equally divided into j parts with respect to each of the i parts to form a series of angular annular zone regions, thereby obtaining an array of θ(i,j);

a light flux of the light source within each part of the θ angle in each part of the three-dimensional angle is:

$$E_{total} = \int_{\theta(i,j)}^{\theta(i,j+1)} \int_{\varphi(i)}^{\varphi(i+1)} I_0 \cos \varphi \sin \varphi d\varphi d\theta;$$

an annular zone division is carried out for the target lighting region based on the energy conservation law;

corresponding to the annular zone division of the three-dimensional angle of the light source, rectangular coordinates of the lighting surface are also correspondingly divided into elliptical annular zone regions, a semi-major axis a and a semi-minor axis b of the ellipse are respectively divided into i parts in x and y directions, and formed ellipse is represented by:

x=$a_i$ cos α y=$b_i$ cos α wherein ai represents an $i^{th}$ part of the semi-major axis a upon an equal division, bi represents an $i^{th}$ part of the semi-minor axis b upon the equal division, and α takes a value in a range of 0 to 2π;

with respect to each i, a is divided into j parts, arrays ai, bi, x(i,j) and y (i,j) one-to-one corresponding to θ(i) and arrays in the three-dimensional angle of the light source in a rectangular coordinate system of a receiver screen are obtained;

with respect to the freeform-surface, in the target lighting region, each part of the θ angle corresponds to the annular zone region enclosed by a part of the ellipse, wherein the annular zone region has a total energy of:

$$E_l = \delta(k) \int_{-\mu}^{\mu} \int_0^{-v} [s(x(i+1, j), y(i+1, j)) - s(x(i, j), y(i, j))]dxdy;$$

wherein S(x(i, j), y(i, j)) represents an area function of the annular zone region defined by a part of the ellipse below a horizontal line, u represents the semi-major axis of the ellipse, v represents the semi-minor axis of the ellipse, α corresponding thereto takes a value in a range of π to 2π, δ(k) represents an illumination value, in accordance with the international standard GB25991 2010, the luminance value on the lighting surface of the high-beam lamp is defined as a predetermined illumination E, which is configured to control the illumination value in a designated region on the receiver screen in combination with the δ(k) function, form a predefined illumination distribution; and with respect to different regions on the lighting surface:

$$\delta(k) = t\frac{i-k}{i}E$$

the light emitted by the light source is totally projected onto the lighting surface, and the annular zone region and the three-dimensional angle of the light source observe the energy conservation law:

$$E_{total} = E_l.$$

4. The double freeform-surface lens with uniform color temperature according to claim 1, wherein an optical material of the double freeform-surface lens is PC or PMMA or optical glass.

* * * * *

UNITED STATES PATENT AND TRADEMARK OFFICE
CERTIFICATE OF CORRECTION

PATENT NO. : 10,578,275 B2  
APPLICATION NO. : 16/472202  
DATED : March 3, 2020  
INVENTOR(S) : Hong Wang et al.

Page 1 of 1

It is certified that error appears in the above-identified patent and that said Letters Patent is hereby corrected as shown below:

On the Title Page

(72) Inventors should read:  
Hong WANG, Guangdong, (CN);  
Peng GE, Guangdong, (CN);  
Xiang WANG, Guangdong, (CN)

Signed and Sealed this  
Fourteenth Day of July, 2020

Andrei Iancu  
*Director of the United States Patent and Trademark Office*